(12) United States Patent
Kaiser et al.

(10) Patent No.: US 10,152,727 B2
(45) Date of Patent: *Dec. 11, 2018

(54) SYSTEM AND METHOD FOR MARKETING ATTRIBUTION IN AN ENTERPRISE

(71) Applicant: Genesys Telecommunications Laboratories, Inc., Daly City, CA (US)

(72) Inventors: Lizanne Kaiser, Richmond, CA (US); Cliff Bell, Kalispell, MT (US); Daniel Stoops, Powell, OH (US); Herbert Willi Artur Ristock, Walnut Creek, CA (US); James Kraeutler, Cardiff, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,362

(22) Filed: Nov. 7, 2016

(65) Prior Publication Data

US 2017/0140420 A1 May 18, 2017

Related U.S. Application Data

(63) Continuation of application No. 14/577,879, filed on Dec. 19, 2014, now Pat. No. 9,491,294.

(51) Int. Cl.
| | |
|---|---|
| *H04M 3/00* | (2006.01) |
| *H04M 5/00* | (2006.01) |
| *G06Q 30/02* | (2012.01) |
| *H04M 3/51* | (2006.01) |
| *H04M 3/523* | (2006.01) |
| *G06Q 10/10* | (2012.01) |
| *G06Q 30/00* | (2012.01) |

(52) U.S. Cl.
CPC ....... *G06Q 30/0246* (2013.01); *G06Q 10/109* (2013.01); *G06Q 10/1093* (2013.01); *G06Q 30/01* (2013.01); *G06Q 30/0256* (2013.01); *G06Q 30/0264* (2013.01); *G06Q 30/0277* (2013.01); *H04M 3/5183* (2013.01); *H04M 3/5191* (2013.01); *H04M 3/523* (2013.01); *H04M 3/5232* (2013.01); *H04M 2203/402* (2013.01)

(58) Field of Classification Search
CPC ............. H04M 3/5183; H04M 3/5191; H04M 3/5166; H04M 3/523; H04M 3/493; H04M 3/5233
USPC ............ 379/265.09, 265.05, 201.01, 265.11, 379/265.01, 88.01; 370/352
See application file for complete search history.

(56) References Cited

U.S. PATENT DOCUMENTS

| | | |
|---|---|---|
| 8,259,924 B2 | 9/2012 | Korolev et al. |
| 8,295,465 B2 | 10/2012 | Altberg et al. |
| 8,755,511 B2 | 6/2014 | Duva et al. |
| 2007/0226057 A1 | 9/2007 | Laruelle et al. |
| 2007/0242626 A1 | 10/2007 | Altberg et al. |
| 2008/0288349 A1 | 11/2008 | Weisberg et al. |
| 2009/0171749 A1 | 7/2009 | Laruelle et al. |

(Continued)

*Primary Examiner* — Thjuan K Addy

(57) ABSTRACT

A system and method include a customer engagement platform of an enterprise. The customer engagement platform is configured to connect with an audience computer and provide to the audience computer contact information associated with a marketing attribution. The marketing attribution accompanies an impression served to the audience computer. The impression and marketing attribution associated with the contact information are sent to the customer engagement platform during an interaction with the enterprise.

18 Claims, 9 Drawing Sheets

(56) References Cited

U.S. PATENT DOCUMENTS

| | | |
|---|---|---|
| 2010/0161540 A1 | 6/2010 | Anisimov et al. |
| 2011/0116618 A1 | 5/2011 | Zyarko et al. |
| 2013/0054684 A1 | 2/2013 | Brazier et al. |
| 2013/0124641 A1 | 5/2013 | Ryabchun et al. |
| 2014/0278955 A1 | 9/2014 | Nygaard et al. |
| 2014/0324603 A1 | 10/2014 | Savkar et al. |
| 2015/0381674 A1* | 12/2015 | Klemm ............... H04M 3/5166 709/203 |
| 2016/0050320 A1 | 2/2016 | Montenegro et al. |
| 2016/0180381 A1 | 6/2016 | Kaiser et al. |
| 2016/0182720 A1 | 6/2016 | Kaiser et al. |

\* cited by examiner

SYSTEM AND METHOD FOR MARKETING ATTRIBUTION IN AN ENTERPRISE

CROSS-REFERENCE TO RELATED APPLICATIONS

This application is a continuation of U.S. patent application Ser. No. 14/577,879, filed on Dec. 19, 2014, now U.S. Pat. No. 9,491,294, the disclosure of which is hereby incorporated by reference in its entirety.

BACKGROUND

Contact centers can process transactions and general servicing of customers' needs. Modern contact centers use proactive methods to reach out to persons who may be existing or potential customers in order to anticipate needs of such persons and to elicit engagement of those persons in transaction and or service-based processes hosted by the contact center. Initiating proactive contact can include proactive telephone contact based on some information already known about the person. For example, a person may click on a product description to learn more about a product advertised on a web page (or within a mobile application, email, text message, streaming TV/media, or other internet/electronic-based communication channel). When the contact center learns of this action by the person, an automated offer may be delivered to that person, e.g., a pop-up message, which asks the person if they would like to chat with an agent, receive or schedule a call, make an appointment in a branch or store, or be redirected to an order page, for example.

BRIEF DESCRIPTION OF THE DRAWINGS

In association with the following detailed description, reference is made to the accompanying drawings, where like numerals in different figures can refer to the same element.

DETAILED DESCRIPTION

Marketing spending is intended to drive enterprise revenue. With the growth of the Internet network, electronic advertising, including advertising via web pages, mobile applications, emails, text messaging, streaming TV/video/media, etc., e.g., search result page advertising via the Internet, have become vehicles for opt-in advertising and/or drive follow-up by the prospect or customer through various communication channels. Targeting methods for electronic advertising include targeting consumers based on search keyword, browser behavior, navigation history, profile information, likes or dislikes, survey response, GPS coordinates, social media activities, etc. For electronic advertising, a consumer receiving the advertisement may interact with it to initiate a process which represents the goal of the advertisement, e.g., a sale to a consumer of a service or a product.

For purposes of explanation, the term contact center is used to refer to the contact point within the enterprise or organization that is interacting with the prospect or customer. The embodiments are not restricted to traditional contact center agents. The contact point can also include situations such as a representative in a branch, store, back office, home-based worker, field worker, outsourcer, and/or virtual agents or other forms of self-service automation, etc. Any point of contact is possible. Also, an agent is a point of contact agent or other enterprise representative.

Figure 1:
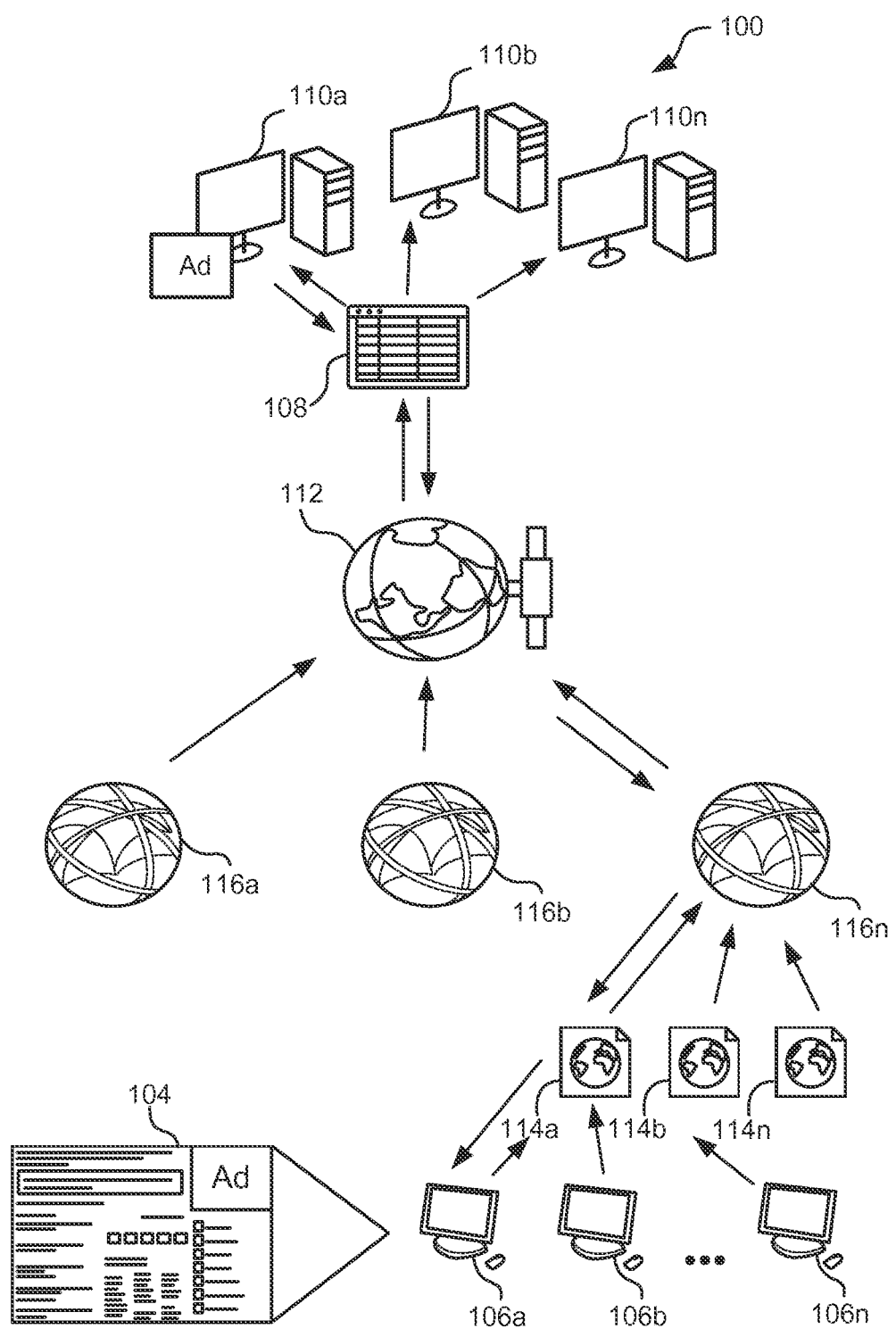
FIG. 1 is a block diagram of an example impression delivery network.

FIG. 1 is a block diagram of an example impression delivery network 100. For purposes of explanation, an online advertising platform is described, but other types of advertising platforms can be used including print advertising, radio advertising, television advertising, etc. The impression delivery network 100 may be a data packet network or network segment including a delivery network over which the impressions 104, e.g., advertisements, may be served to an audience computer 106a, b, n. The audience computer 106a, b, n can include a computer or any other suitable end device of a potential customer, an existing customer, etc. Broadband, digital subscriber line (DSL) services, cable, etc. may be employed in the delivery architecture.

A demand-side platform 108 allows marketers on market side computers 110a, b, n to manage multiple ad exchange and data exchange 112 accounts through an application programming interface (API). Publishers 114a, b, n of ad networks 116a, b, n make requests for bids and retrieve the impressions 104 from the ad exchange 112 to send the impressions 104 to the audience computers 106a, b, n. A publisher 114a, b, n and ad network 116a, b, n can include a search engine provider, e.g. YAHOO, or other publisher. An exemplary ad exchange 112 is the DoubleClick Ad Exchange. Real-time bidding for display of the impressions 104 online can take place within the ad exchanges 112. By utilizing the demand side platform 108, the publishers 114a, b, n can manage their bid requests for the available advertising space and the pricing for the impressions 104, and the market side computers 110a, b, n can manage the advertisements that they are layering on to the website to target the audiences of the audience computers 106a, b, n. The market side computers 110a, b, n can perform various functions including design of marketing advertisements campaigns and arbitration of advertisement assignments to publishers, e.g., automated, based on rules. Logic for arbitration can include determining an actual current presence of end users and pricing. If the impression 104 includes an option for a communication with the representative 206, e.g., a chat or a call, then pacing can be implemented. Pacing is related to hit rate, e.g., percentage of accepted offers, which may vary across publishers 114a, b, n, and can depend on further parameters including time of day, season, etc., as described below. A winning bid from the market side computers 110a, b, n gets its impression 104 displayed.

Figure 2:
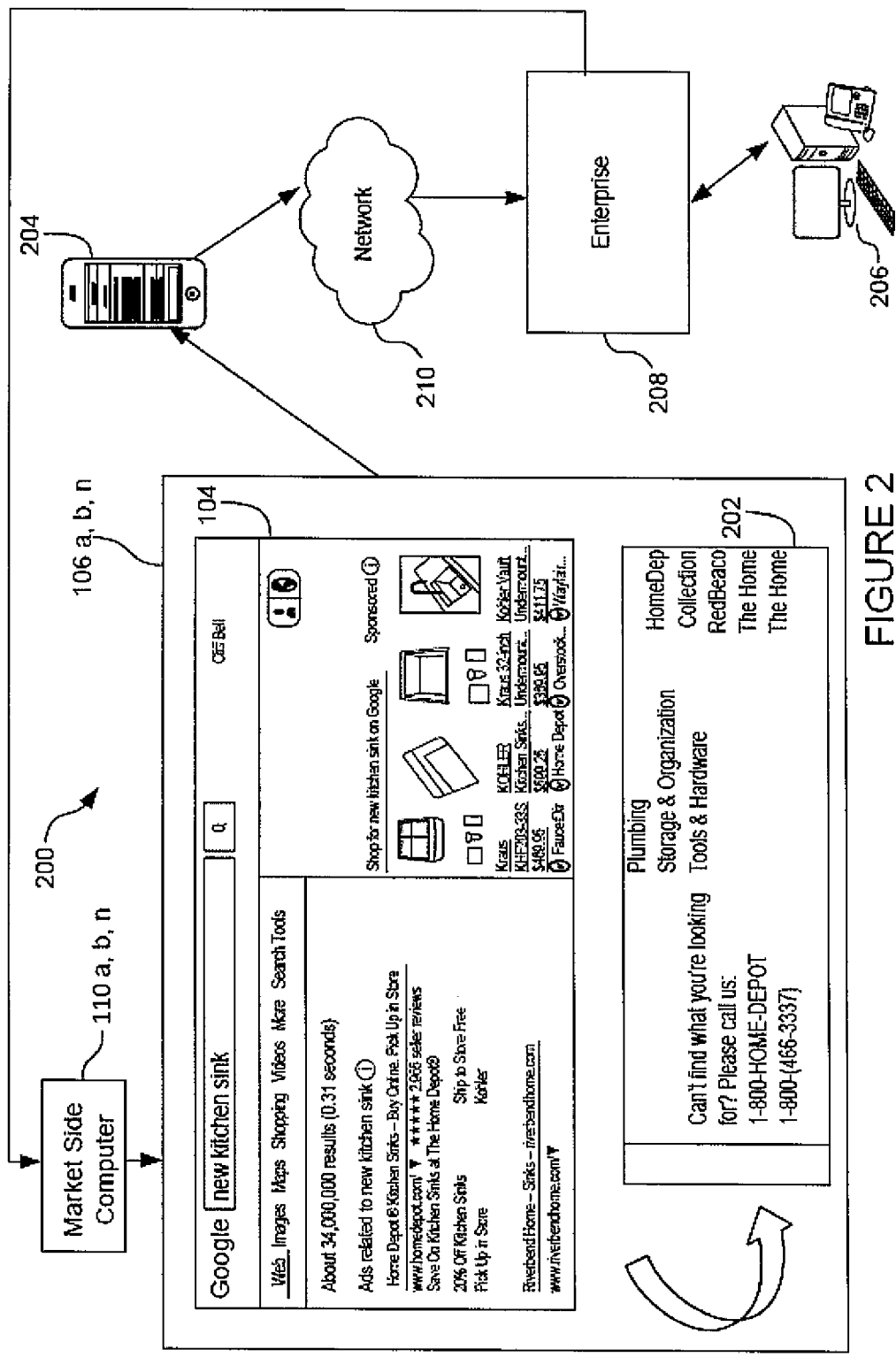
FIG. 2 is a block diagram of an example support side architecture for supporting the advertisement delivery network, or other delivery networks.

FIG. 2 is a block diagram of an example support side architecture 200 for supporting the impression delivery network 100, or other delivery network. Digital advertising purchases can be evaluated based on historical campaign data, web usage criteria, page traversal, and other data. The demand side platform 108 allows market side computers 110a, b, n to optimize their bids based on key performance indicators, e.g., effective cost per click (eCPC) and effective cost per action (eCPA). This ensures the right product or service is offered to a particular audience computer 106a, b, n. The organization utilizing the market side computers 110a, b, n may want to deliver the representative 206 to timely support the sales or service opportunity without the audience of the audience computer 106a, b, n having to wait more than a determined amount of time. As described in more detail below, this can be addressed by proper pacing of the advertisement campaign, matching generated inbound traffic with available resources, e.g., representatives 206.

For example, the impression 104 may include contact information 202 so that the audience can use a communication device 204 to connect over a network 210 with the representative 206, e.g., agent, at an enterprise 208, e.g., a contact center, a branch, store, a back office, a home-based agent, etc. The communication device 204 can include a mobile phone, a landline phone, a computer, etc. The network 210 can include a public switched telephone network (PSTN), including for example, telephone lines, Voice Over Internet protocol (VoIP), fiber optic cables, microwave transmission links, cellular networks, communications satellites, undersea telephone cables, etc., interconnected by switching centers, and/or a local area network (LAN), a wide area network (WAN), e.g., the Internet, a city area network (CAN), a metropolitan area network (MAN), etc., e.g., enabled for a point of contact by a GENEYSY SIP server.

The market side computers 110a, b, n may be used by a marketing team to determine which advertising methods are most valuable. With feedback from the enterprise 208, the market side computer 110a, b, n can track digital marketing from the initial impression 104 through the contact and/or purchase process with the representative 206 to see which impressions 104 drew the customer to the web page and subsequently to a customer contact and/or purchase. Other scenarios include the enterprise trying to get the audience to 'opt into' is an activity such as completing a survey or volunteering for a non-profit or political organization, etc. The initial sales lead may be captured online/electronically, and/or an actual purchase may not take place until the customer is interacting in a more direct communication channel, e.g., while talking on the phone with the representative 206 and/or during an in-person meeting with a branch/ store representative that may have been scheduled as part of the initial online lead capture.

The digital marketing attribution can be maintained whether or not the customer reaches out to the enterprise 208, e.g., contact center or other point of contact, for help through an inbound phone call as part of the customer contact and/or sales process. Points of contact can include a branch, store, back office, home-based agent, etc. The initial digital interaction, e.g. filling out a web form, can be paired with a direct inbound phone call in this way. The pairing can identify the given a publisher/website combination, or additionally a date/time, etc. For example, a customer may delay a call to the next day. Pairing for chat can assume that the chat is launched directly from the website where the impression 104 was displayed. The impression 104 can offer further communication options, e.g. social media including FACEBOOK, TWITTER, etc. If directly invoked from the given website then the context can be transferred as well. If the phone call is done through a different end device, e.g., rather than a WebRTC call from the same website, then pairing may require a unique ID, e.g. different 800# per publisher/website, or additional keyword, promotion code, or a quick response (QR) code, etc.

As a result, phone calls into the enterprise have marketing attribution with the ability to tie the particular ad-spend to the enterprise's sales or service results. The fed back information can be used in various ways, e.g., to inform the market processing system of the best time to serve impressions 104 for determined topics, e.g., when more people are interacting with the impressions 104, or when more representatives 206 are needed, e.g., to schedule their work shifts, perform intra-day staffing/schedule adjustment, e.g. comparing actual traffic during first business hour with predicted one and proportionally adjusting staffing, etc. Additionally or alternatively, the demand side platform 108 can send information to a customer engagement platform 420 to aid the enterprise 208 with scheduling representatives 206. The customer engagement platform 420 can include the CRM and/or CXP 344, or other platform that is can serve dynamic contact information, e.g., phone numbers or extension, and tie the dynamic numbers to both the marketing attribution and the subsequent customer contact/interaction.

Additionally, web traffic volume, views on the web page in which the impressions 104 appears, and/or CTR (click-through rates) can be tracked, and it is possible to determine the full conversion path correlated with that marketing attribution if the conversion path includes a direct inbound phone call. Other data can also be tracked, e.g., if the impression 104 that led to the call was forwarded from another person, etc. For example, the market side computers 110a, b, n forwards an impression 104 to the web page of the audience 106a, b, n, and when the audience 106a, b, n opens a link the publisher 114a, b, n determines through cookies or surrounding circumstances that the opened page is not a typical entrance page, e.g., that the impression 104 was forwarded. Additionally or alternatively, sharing the information via social media can be monitored. Additionally or alternatively, when the audience 106a, b, n calls the representative 206 can ask whether the link was forwarded, e.g. during a conversation with the representative 206 or in a survey.

The market side computers 110a, b, n can measure the cost-effectiveness of particular advertisements and ad placements, in terms of quantifiable benefit metrics such as cost per action/acquisition (CPA), versus the enterprise 208 having an arbitrary or estimated marketing attribution. Alternatively, enterprises can set up determined contact information, e.g., phone numbers that are used with general marketing categories to get an aggregate count of phone calls, e.g. fifty calls came into the point of contact today for "upgrade" campaigns. The feedback from the enterprise 208 to the market side computer 110a, b, n allows for the individual customers to be associated with a marketing campaign once the customer has dialed the enterprise 208. Therefore, it is possible to tie sales closure rates for individual customers to a specific marketing campaign or advertisement.

Figure 3:
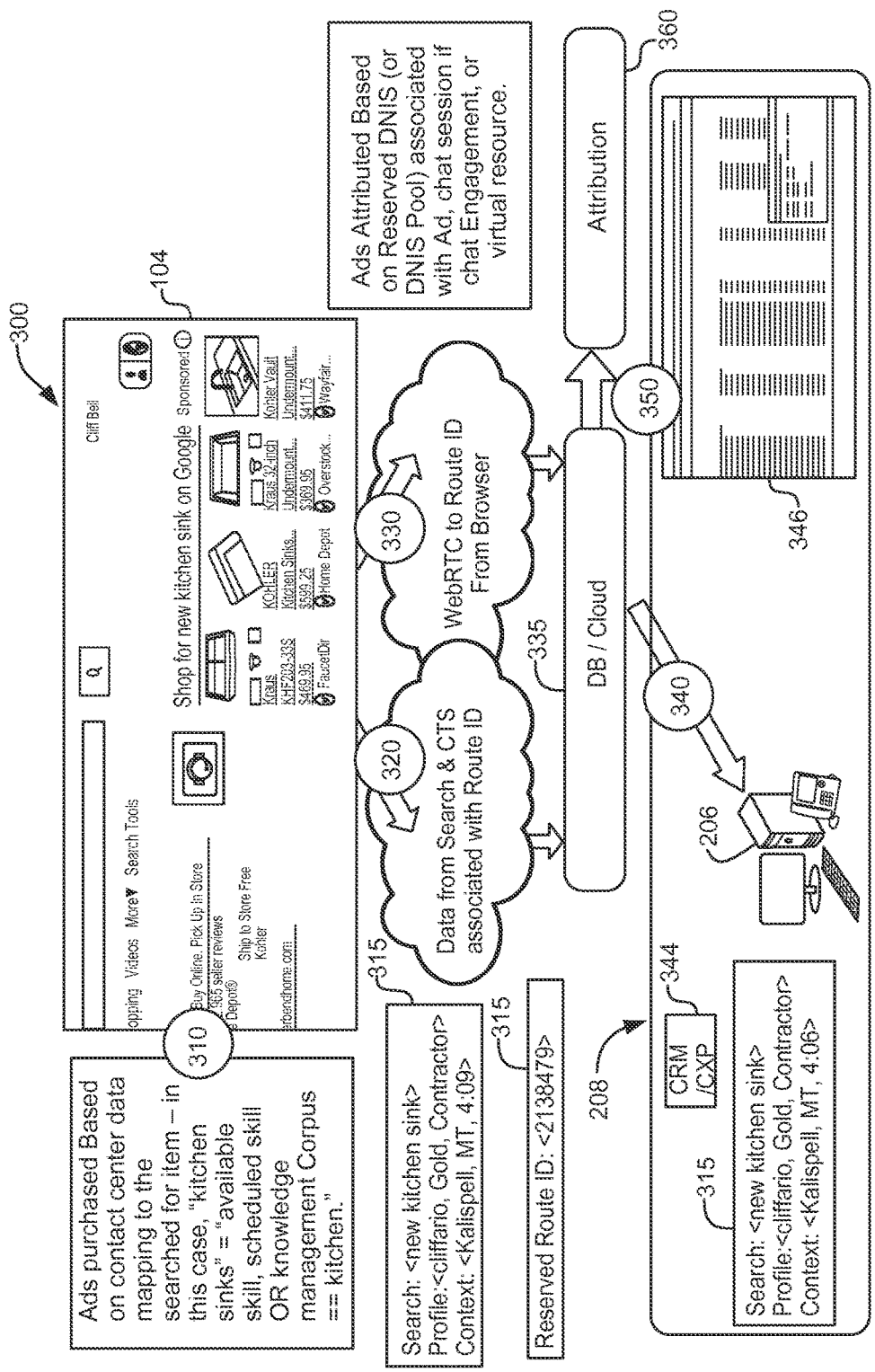
FIG. 3 is a block diagram of an example support side architecture for supplying a representative in the advertisement delivery network, or other delivery networks.

FIG. 3 is a block diagram of an example support side architecture 300 for supplying representatives 206 in the impression delivery network 100, or other delivery networks. The enterprise can set an advertisement budget to determine a number of impressions 104 to purchase. In one implementation, the impressions 104 can be purchased based on data received from the enterprise 208, e.g. regarding an availability of skilled representatives to converse with the audience about the impression 104 (310). Representative availability and skill data received from the enterprise 208 can be mapped to the searched for item to determine whether or not to purchase the impression 104. Other factors, e.g., representative rank, talent of the representative in a determined skill area such as selling, etc. can also be used. The factors can vary for different publishers 114*a, b, n*, e.g. due to the types of the audiences, including age, gender, geographic-location, interests, etc., visiting the website of the publishers 114*a, b, n*. Availability can mean immediately available or available within a determined amount of time, e.g., in the near future, at a particular time of day, etc. The audience computer 106*a, b, n* searches for a product or service, e.g., for kitchen sinks. Publisher 114*a, b, n*, can place the impression 104 in the search results, e.g., in a search result list, of the audience computer 106*a, b, n*. The market side computers 110*a, b, n* may send impressions 104 to the publishers 114*a, b, n* in different modes, e.g., one-by-one, in batches (determined fixed number), for fixed time slots (but unlimited number), or any combination thereof. The publisher 114*a, b, n* can adjust the placing for each such mode.

The audience computer 106*a, b, n* can be used to select, e.g., click on, the impression 104 in the search results and be directed to a website of the seller enterprise. The website can encourage the audience 106*a, b, n* to reach out to the enterprise 208, e.g., "Representative waiting to help you!" by dialing the provided phone number. Alternatively, the website can encourage the audience to reach out by displaying the call number or chat link in the impression 104, without the audience 106*a, b, n* having to click it. For each impression 104, data 315 can be collected about search that leads to the impression 104 to be served, and the click through seller (CTS) data associated with the route identification (ID) (320). Additionally or alternatively, the audience computer 106*a, b, n* can be provided with a web browser link to connect with the representative 206 of the enterprise 208. For example, WebRTC provides web browsers with Real-Time Communications (RTC) capabilities via simple JavaScript APIs. The WebRTC route ID information can be collected from the browser (330). The route ID and data from the search and CTS can be stored in a database, e.g., a local or remote database or distributed databases, and/or the cloud 335. Collected data 315 can include search information, e.g., about the type of product or service, profile information, e.g., audience ID, level of service, and type of audience, and context information, e.g., location of the audience member, time of the contact, etc.

The call or web browser communication along with the collected data 315 is sent to and/or accessed by the enterprise 208 (340). At the enterprise 208, a customer relationship management (CRM) system and/or a customer experience platform (CXP) 344, e.g., GENESYS Customer Experience Platform, potentially further enhanced by GENESYS Conversation Manager capabilities, can be used to manage the contact center interactions with the customer. The CRM and/or CXP 344 organizes, automates and synchronizes sales, marketing, customer service, and technical support. Calls and browser interactions are answered by the representative 206 or placed in a queue to wait for a next available representative. A service window 346 can display the queue to the representative 206. The representative 206 of the enterprise 208 can be skilled in discussing kitchen sinks, or a knowledge management corpus at the enterprise 208 can be available that have the skill to discuss kitchen sinks. The knowledge workers can be invited to handle the call or chat. This can be done through pacing of invites to knowledge workers, and keeping those who accepted for a short time in a pool of reserved knowledge workers. Queued interaction requests are matched to reserved knowledge workers. In order to not block the knowledge workers, the knowledge workers can leave the knowledge worker pool after configurable timeout, even if no interaction was assigned. Another scenario is transfer from representative 206 to knowledge worker, e.g. a two-step or a blind transfer. The representative 206 removes the call or browser interaction from the queue and helps the customer to resolve an issue or make a purchase.

The impression 104 can be attributed, for example, based on a reserved dialed number identification service (DNIS) associated with the impression 104 for a call (which may be a full phone number DNIS and/or a unique extension number appended to the DNIS), and/or based on a session for a chat engagement via the browser or for a virtual resource, and/or based on a scheduled contact or appointment with a representative within the enterprise 350). The reserved phone number, for example, is associated with the marketing attribution, and the marketing attribution can accompany the impression 104 served to the audience computer 106*a, b, n*. Means other than the phone number can be used to identify the impression 104, e.g., based on the publisher 114*a, b, n*, the navigation path, the date/time, etc. The marketing attribution made by the enterprise 208 regarding the call can include a call resolution to be shared with the market side computer 110*a, b, n*. For example, the enterprise 208 can indicate that a sale was made, that a sale was not made, that caller will call back, that the caller wants a call back, etc.

Additional or alternative to a dynamic DNIS, the embodiments can be used with other communication channels, including non-phone type communication channels. For example, one implementation includes the impression 104 providing a reserved appointment time in an office, branch or store. If the prospect or customer accepts the appointment invitation, the marketing attribution for the impression 104 is tied to the in-person interaction with the prospect or customer. For example, the impression 104 may be related to having a retirement health check analysis done by an investment specialist at the local investment banker branch office.

Figure 4:
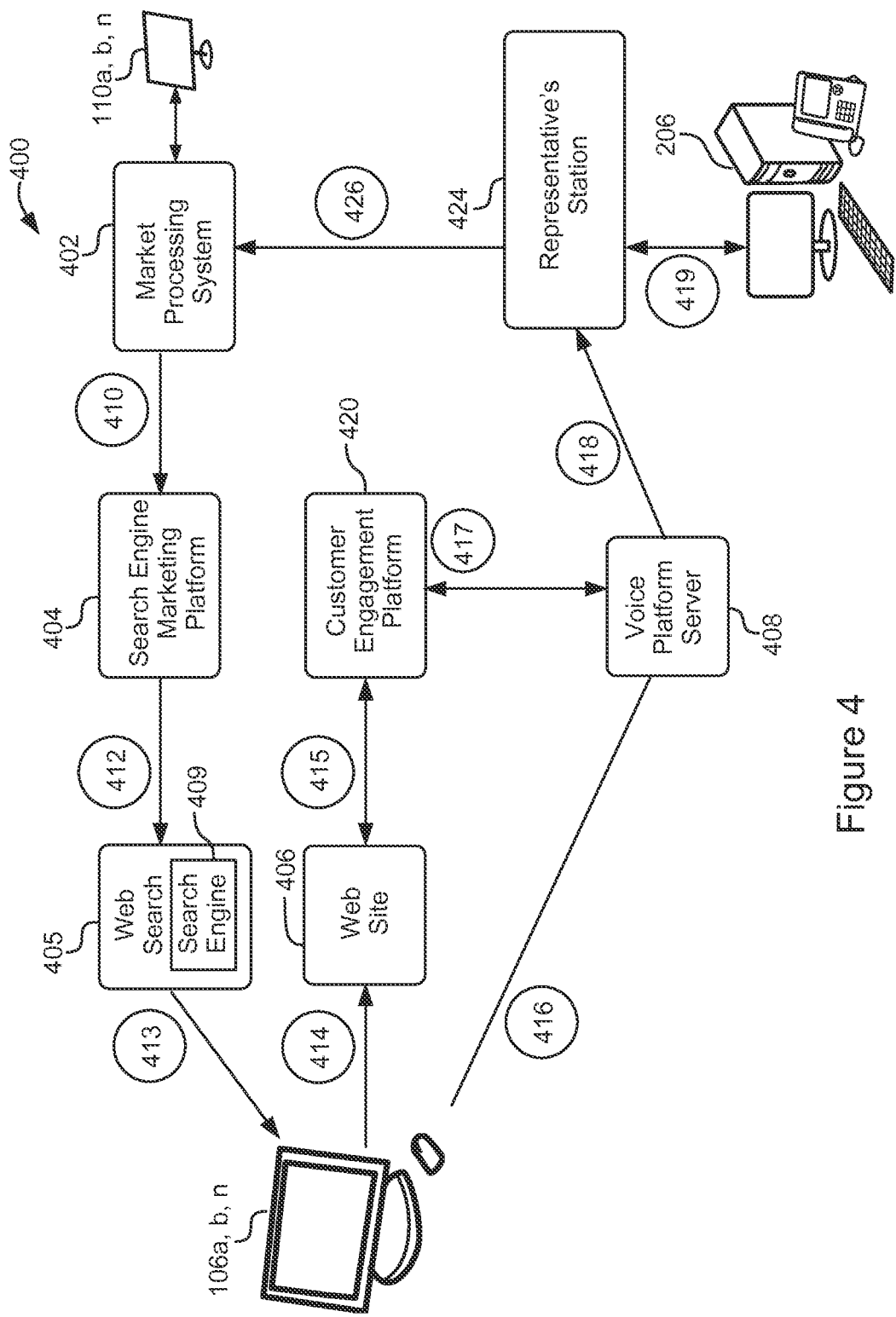
FIG. 4 is a block diagram of an example architecture to consider market attribution when serving impressions.

FIG. 4 is a block diagram of an example architecture 400 to consider market attribution when serving impressions 104. The example uses web search as the communication method, however, there are many other possible communication methods including mobile, short message service (SMS), online ads, etc. to deliver communication for a determined campaign. A market processing system 402 provides digital marketing technology that offers email and web based marketing campaign management tools to the market side computers 110*a, b, n*. A search engine marketing (SEM) platform 404 connected with the market processing system 402 requests advertisement bids and volume (410). The market processing system 402 sends impressions 104 to a search engine marketing platform 404, e.g., via an email link or to be displayed during a web search 405, in accordance with an advertising budget and based on feedback from the representative station 424, as described in more detail below (412).

The audience computer 106*a, b, n* searches for a product or a service, e.g., via a web browser (413). The search engine marketing platform 404 sends the impressions 104 to the web browser during the web search. In the context of a search, a search engine 409, e.g., ad networks 116*a, b, n* and publishers 114*a, b, n* of FIG. 1, can determine an impression 104 for the audience computer 106*a, b, n* based on attributes provided by the market side computers 110*a, b, n*. Additionally or alternatively, the impression 104 can be placed on a web page during web browsing, without the need for a search. In one example, the impression can be placed on the page based on information obtained from cookies. The attributes can include a location of the target audience, e.g., audiences living in the Midwest, a determined age range, a determined gender, a determined net worth, a determined language, etc. Included with the attributes can be a customer identifier and/or a scoring number. The website 406 requests a dynamic number from the customer engagement platform 420 by sending the marketing attribution, as described in more detail below (415). The website can encourage the customer to reach out to the enterprise 208 with a "Representative waiting to help you!" by dialing the number. A voice platform server 408 can answer the call the place the call in the queue 410 to be picked by a representative station 424 (418).

The voice platform server 408 retrieves marketing attribution from the customer engagement platform 420, e.g., based on the dialed number. If the pool of reserved numbers is limited and reused in a cyclic way then additionally a timeslot for calling can be given to preserve an association with the triggering context. The representative 206 can answer the call at the representative station 424 (419). The station can include a phone and a computer, the computer including a processor and memory. The call can be made in various media and/or social channels, including voice, chat, text, video, schedule contact/appointment, etc., both separate and combined. The call can be an inbound call from the customer to the representative 206, or an outbound call, e.g., the representative 206 initiating a call with the customer and/or returning a call to the customer.

An exemplary voice platform server 408 is a GENESYS voice platform (GVP) server. An interactive voice response (IVR) server which allows a computer to interact with during a call with the customer can be used to help answer the calls and place the calls in the queue 410, e.g., using dual tone—multi frequency (DTMF) tones input via a keypad. The voice platform server 408 answers the call and places the caller in the queue 410 and when the representative 206 becomes available then the audience member is removed from the queue 410. The representative 206 helps the customer to resolve an issue or make a purchase, etc. Alternatively, in certain scenarios the IVR may be sufficient to finish the sale, without need for a live representative 206. Since IVR resources are also limited, e.g., a number of concurrent media control platform (MCP) ports is limited, a pacing of when to place the impressions 104 can be required.

The representative station 424 can connect with the market processing system 402 to feed back customer interaction data, e.g., call data, and sales conversion data to the market processing system 402 (426). In addition to the collected data 315 described in FIG. 3, e.g., about the type of product or service, profile information, e.g., audience ID, level of service, and type of audience, and context information, e.g., location of the audience member, time of the contact, etc., the representative station 424 can provide customer interaction data. The customer interaction data along with the customer ID can include negative and positive outcomes of the customer engagement, e.g., whether there was a sale, whether there was not a sale, whether the caller stated they would like time to consider the product or service and they would call back, whether the caller wants time to think about the product or service and a return call, etc. The data from the representative stations 424 can inform the market side computers 110a, b, n that the caller is expecting a follow-up call and allows for estimated hit rates, which can be important for tuning campaign pacing. This information can be stored with the customer histories for the enterprise 208. The market processing system 402 can also capture missed opportunities, e.g., the customers that did not engage the impression 104.

The market processing system 402 can utilize the fed back customer interaction data for campaign management and potential campaign adjustment, e.g., to set advertising budgets, determine a number of impressions 104 to delivery, determine where to deliver the impressions 104, etc. The customer interaction data can also be used to update the marketing attribute after the call is completed. By targeting impressions 104 in ways that yield better results, this can improve advertisement fulfillment and cost reduction. In this way, attributes that would otherwise only be available to or within the enterprise 208 are available to the market side computers 110a, b, n. The fed back data (426) can result in a smaller amount of unique, temporary numbers needed per advertising campaign since the market processing system 402 does not have to use a different number to distinguish between impressions 104. Additionally or alternatively, the enterprise 208 can feed back word-of-mouth effects, e.g. customer communicating about campaign in social media, to the market processing system 402. A social media connector watching for actionable events can capture the data fed back to the market processing system 404. The fed back data can be combined with inbound marketing to try to cross-/up-sell to inbound customers who are not aware of campaigns.

For example, a customer decides it is time to purchase a new bike. Using an audience computer 106a, b, n, she searches on the web for a mountain bike and receives several impressions 104 for mountain bikes along with her search results. The customer clicks on a search result link and the website 406 makes a request to the customer engagement platform 420 for a phone number to reach the enterprise 208 (415). The website 406 sends the marketing attribution to the customer engagement platform 420 and the customer engagement platform 420 associates the attribution with the phone number (and/or extension) reserved for a determined period of time that it sent to the website 406.

The customer decides to call the phone number and ask for help on mountain bike gear ratios. The voice platform server 408 receives the call and the voice application sends the customer's dialed number to the customer engagement platform 420 (417). The customer engagement platform 420 uses the dialed number to retrieve the customer's the marketing attribution associated with that number, e.g., via a lookup table. The customer engagement platform 420 returns the marketing attribution to the voice platform server 408 and releases the dialed number. The voice platform server 408 then appends the marketing attribution key value pairs to the call to the representative station 424 (418). After the representative 206 has helped the customer with the helmet decision a post-routing script can utilize the marketing attribution key value pairs for reporting to the market processing system 402 (426).

Using the attribution information from the representative station 424, the market processing system 402 can directly associate marketing spend with the original advertisement investment that drove the customer contacts that lead to the business outcomes. The market side computers 110a, b, n can also better ascertain marketing attribution in terms of quantifiable metrics such as cost per action/acquisition (CPA). This allows the market side computers 110a, b, n to better evaluate the effectiveness of advertisement spending and determine where future marketing investments may yield the most return on investment, e.g., before the impression 104 has been purchased.

Advantages include cost savings due to improved marketing attribution as improved insights guide future advertising spending more effectively. Cost savings may also occur due to operational optimization, e.g., labor cost reduction, by being able to better forecast, schedule, and utilize skilled workforce. Cost savings may occur due to reduced representative time required to determine the source or intent of the incoming call. Revenue improvement may occur due to higher sales closure rates as a result of a more relevant and timely connection between the a impression 104 and the interaction with a representative 206 who can close the sale or deliver effective service. Improved customer experience and lower customer effort may also occur, along with improved employee experiences by being able to engage with more engaged, hotter leads. The enterprise 208 is able to report on marketing attribution for individual customer resolutions. The architecture 400 also includes a real-time ability to convey marketing information to the enterprise 208 across an inbound phone call event.

Figure 5:
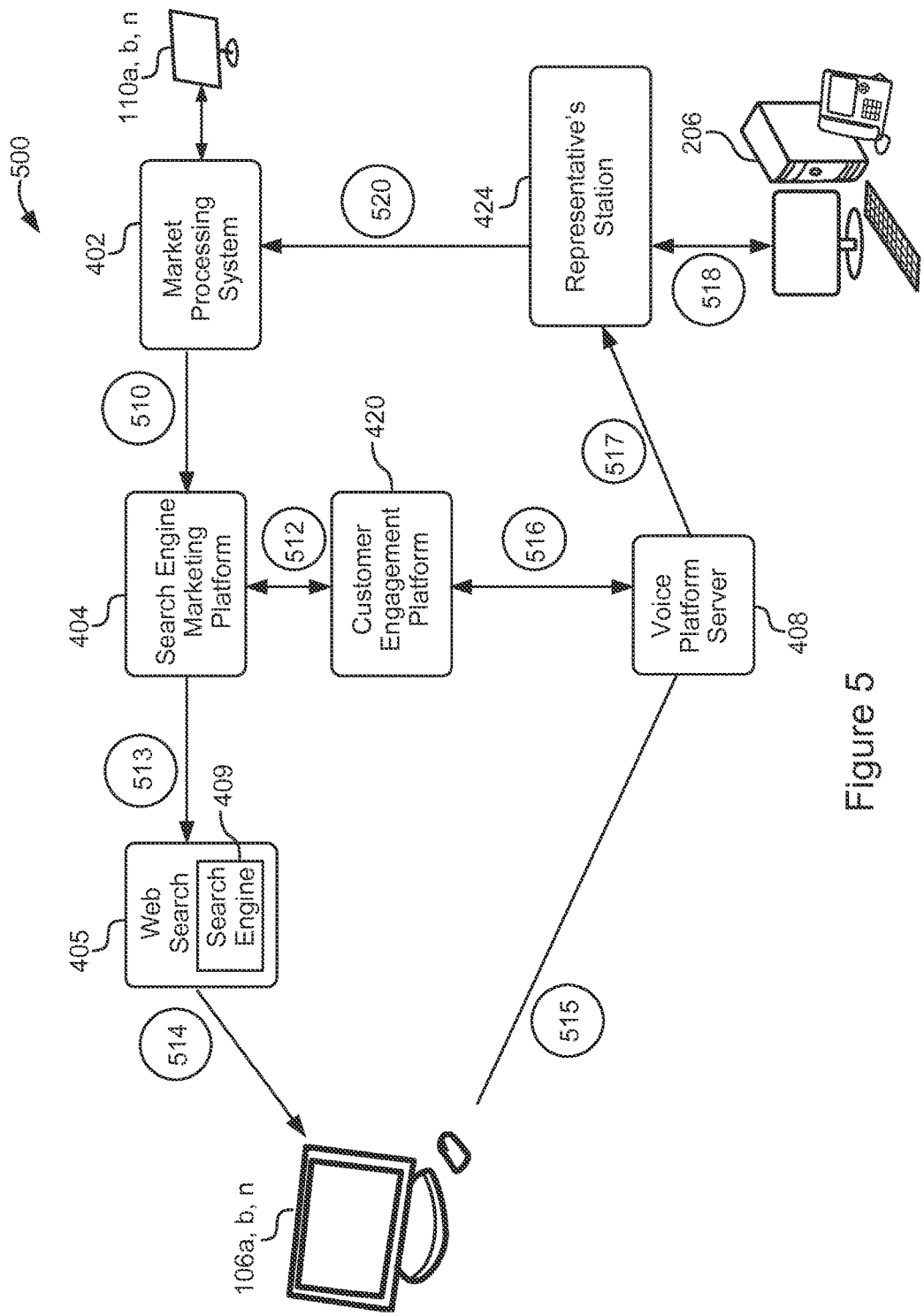
FIG. 5 is a block diagram of another example architecture to consider market attribution when serving impressions.

FIG. 5 is a block diagram of another example architecture 500 to consider market attribution when serving impressions 104. The market processing system 402 sets an advertising budget to determine a number of impressions 104 to delivery (510). The search engine marketing platform 404 requests a phone number from the customer engagement platform 420 (512). Additional or alternative to the phone number, other contact vehicles can be used to establish a link between the web activity and interaction with the customer, e.g., an individual promo code, e.g., a QR code which the customer can scan with smartphone. The code and phone numbers can be dynamic or personalized.

The search engine marketing platform 404 places the impression 104 in the search results along with the phone number (513). The audience computer 106a, b, n, searches for a product or a service and receives the impression 104 with the phone number (514). The customer dials the phone number in the impression (515). The voice platform server 408 answers the phone call and retrieves the marketing attribution from customer engagement platform 420 based on the dialed phone number (516). The voice platform server 408 places the caller in queue and when the representative 206 becomes available then the customer is removed from the queue (717). The representative 206 helps the customer to resolve an issue or make a purchase (518). The representative station 424, e.g. the enterprise 208, shares resolution information with the market processing system 402.

Figure 6:
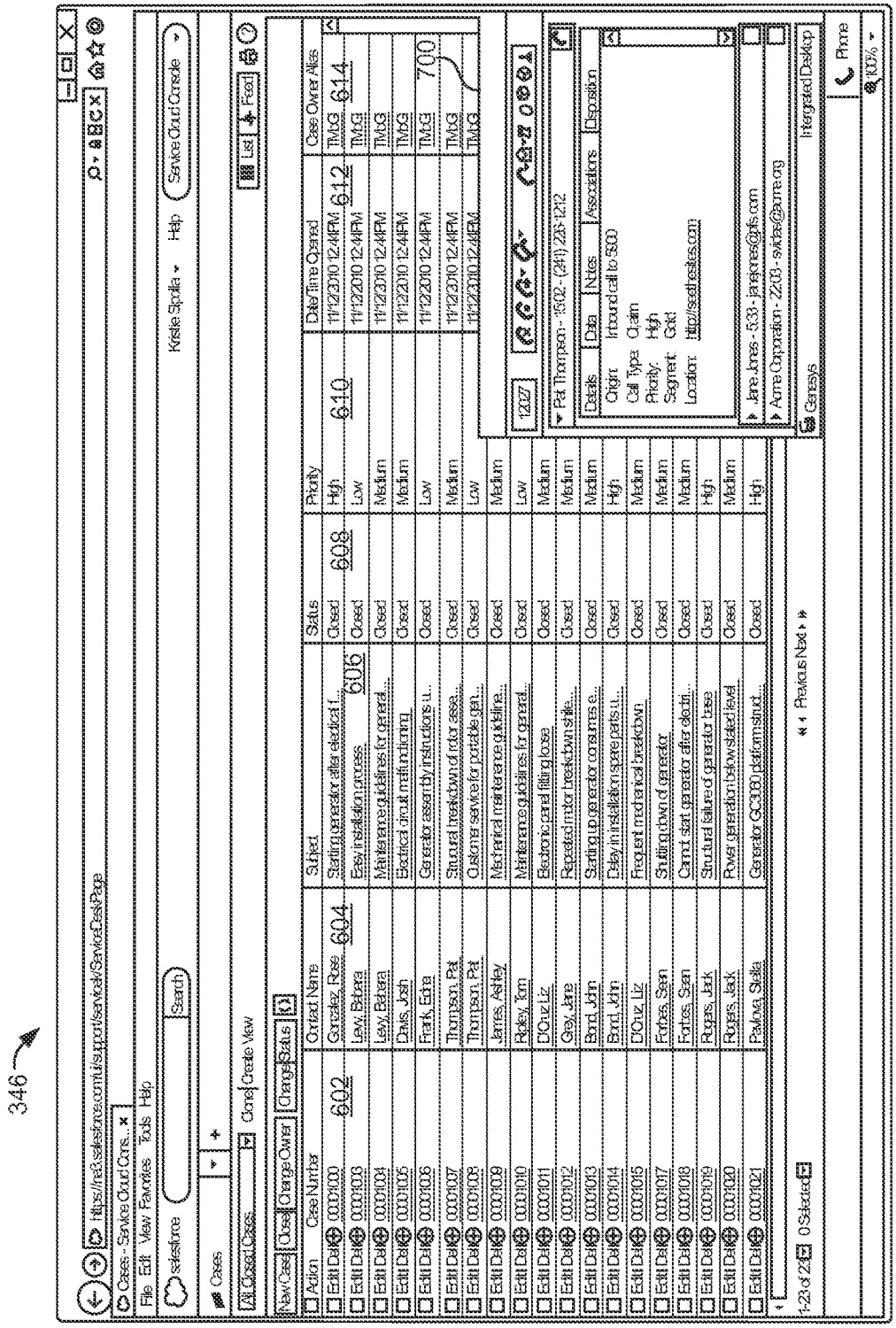
FIG. 6 is a screenshot of an example service window for the representative.

FIG. 6 is a screenshot of an example service window 346 for the representative 206. At the representative station 424 the service window 346 can be displayed to the representative 206 to help manage cases handled by the enterprise 208. For example, when the audience calls the contact center 108 a case can be opened. The service window 346 includes data regarding the cases, including a case number 602, a caller's name 604, a subject 606, a status 608, a priority 610, a date and time that the case was opened 612, and a case owner 614. The service window 346 can provide information to the representative 206 regarding cases that the representative is handling, including cases opened based on a call from the audience as described above. Overlaying the service window 346 can be a call control element 700 to manage inbound/outbound calls, emails, chats, texts, video, etc., e.g., from/to the audience. Information from the service window 346 can be fed back to the market processing system 402.

Figure 7:
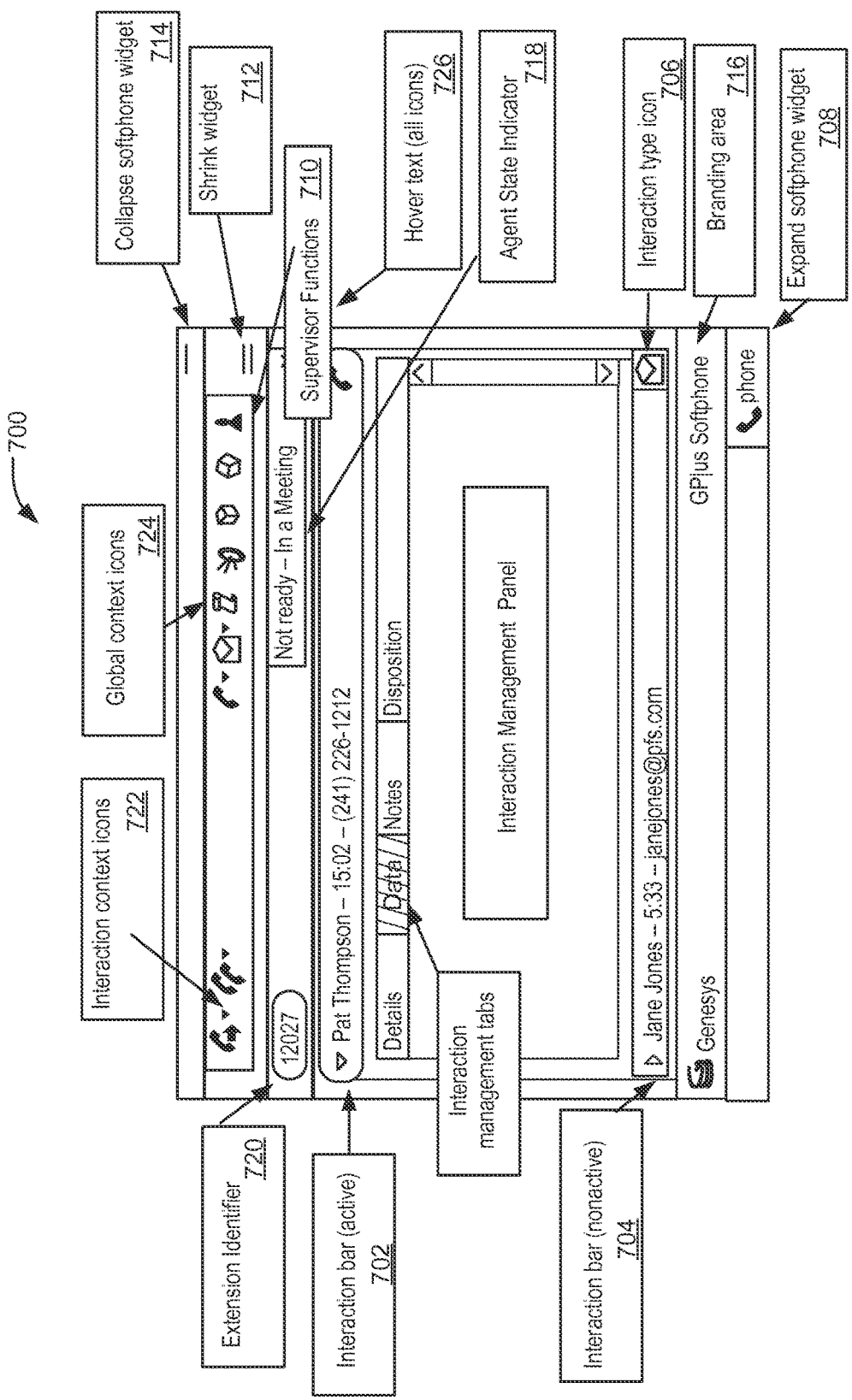
FIG. 7 is a screenshot of an example call control element.

FIG. 7 is a screenshot of an example call control element 700. An active interaction bar 702 includes identification data, including a name of the caller, a time of the call, a telephone number, etc. An inactive interaction bar(s) 704 includes a name of the caller, a time, a telephone number for texts and call, or an email address for chats and emails. The call control element 700 can also indicate an interaction type 706, e.g., call, text, email, chat, video, etc. Other information can be included about the caller, including priority data, whether the caller was prompted by an impression 104, whether the caller is a return caller, etc. The call control element 700 can include user interface icons for the representative 206, including an expand softphone widget 708, a supervisor function 710, a window shrink widget 712, a collapse softphone widget 714, etc. Other indicators can include a branding area 716, a representative state indicator 718, an extension identifier 720, interaction context icons 722, and global context icons 724, etc. Hover text 726 can be displayed for the widgets and icons, etc. to identify the widgets and icons when the pointer is moved over the widget or icon. Information from the call control element 700 can be fed back to the market processing system 402.

Figure 8:
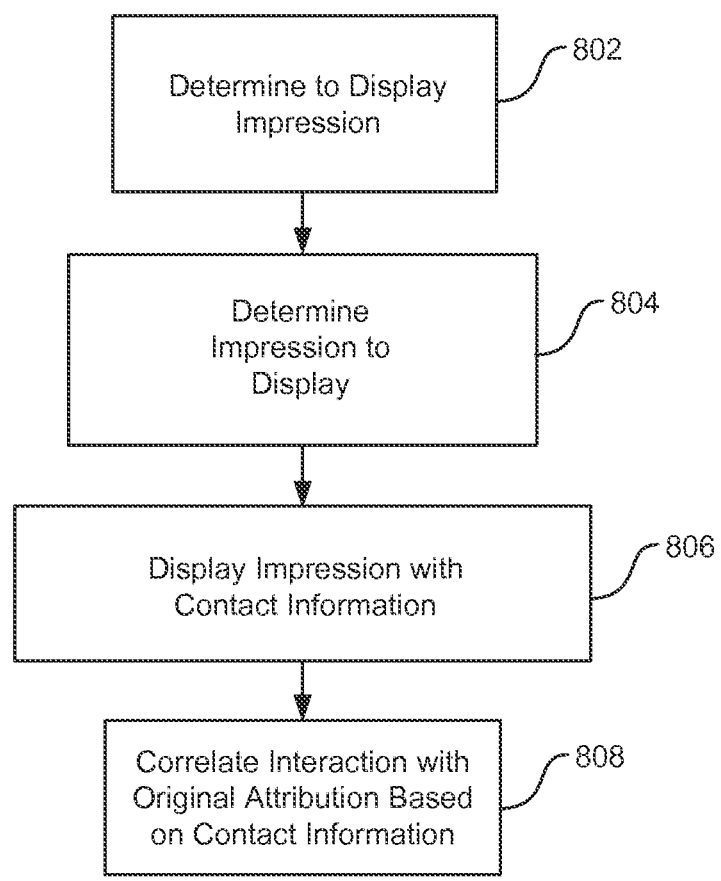
FIG. 8 is a flowchart of an example of market attribution.

FIG. 8 is a flowchart of an example of market attribution. The impression 104 purchase and/or display decision can be made with a connection to representatives 206 having particular skill-sets, e.g., a set of one or more desired skills for handling that type of interaction/sales opportunity, and/or a proficiency level per skill. In some implementations, the impression 104 can be placed based on an availability of the skilled representative 206 within a determined time period before or after the impression is displayed 104. The marketing attribution based connection can occur by utilizing information from the customer engagement platform 420. For example, the impression 104 can present a proactive, dynamic web invitation to engage with a skilled representative 206 via web chat. Additionally or alternative, the impression 104 can present a proactive, dynamic web invitation to engage with a skilled representative 206 via a web callback. This allows the market processing system 402 to evaluate their marketing spend, being able to attribute specific impressions 104 with specific skilled representative interactions, by tying the customer acceptance of the proactive web invitation to chat or receive a web callback back with the original impression 104. Additional or alternative to waiting to send an impression 104 based on information that the correctly skilled representative 206 became available, a bid amount may be higher to send the impression 104 when the representative 206 can handle premium services and products, e.g., insurance, mortgages, legal, financial services, medical, high technology, banking, etc., than if that type of representative 206 is not available within a determined time period of serving the impression 104.

For example, a home buyer browses a web page. In some cases, the home buyer may use a search engine 409 to perform a keyword search for mortgage rates, and in other cases advertisements are sent to the website absent a search. A bank determines to display impression 104 for its mortgage loans on the website (802). In some implementations, the bank only wants to display the impression 104 when there is a skilled mortgage loan officer available to handle potential inquiries. In other implementations, the bank displays the impression 104 at determined times, e.g., during times of high web browsing traffic, during determined times of the day, month, year, when the advertising budget allows for it, etc. If the impression 104 is being displayed based on an availability of skilled representative 206, the enterprise 208 can send to the demand side platform 108 the status of its availability of mortgage-and-chat-skilled representatives, so the demand side platform 108 and ad exchange 112 can take this into account when determining when to present the impression 104 and/or a cost of the impression 104. The search engine marketing platform 404 determines an impression 104 to display (804). In the case of a search, the search engine marketing platform 404 sends the user's search information to the ad exchange 112, which coordinates with the demand side platform 108 to determine the appropriate impression 104 to display, e.g., through ad bidding or other display process, according to determined attributes and business rules as discussed herein.

The impression 104 which is presented can include a proactive, dynamic invitation to engage with an available mortgage-and-chat-skilled representative 206, including contact information (806). The market processing system 402 can correlate the call or chat interaction with the skilled representative 206 back with the original marketing attribution, e.g., based on the contact information (808). Other scenarios are possible. For example, the interaction can start with chat, and then a voice channel is added. For example, the representative 206 can call the customer, or if chat is via WebRTC then add voice to the session. Advantages include that the market processing system 402 can directly associate interactions with skilled representatives 206 and resulting business outcomes back with the original impression 104 that drove those customer contacts. Therefore, the market processing system 402 can better ascertain marketing attribution in terms of quantifiable metrics such as cost per action/acquisition (CPA). This allows the market processing system 402 to better evaluate the effectiveness of ad-spend and where future marketing investments can likely yield a better return on investment.

This can lead to cost savings due to reduced marketing spend on impressions 104, e.g., only pay for advertising volume in line with available skilled representative resourcing. Moreover, there can be cost savings due to improved marketing attribution, e.g., improved insights guide future ad-spend more effectively. Other cost savings can be due to operational optimization, e.g., labor cost reduction, by being able to better forecast, schedule, and utilize the skilled workforce. Revenue improvement can occur due to higher sales closure rates, e.g., as a result of a more relevant and timely connection between the impression 104 and the interaction with a skilled representative 206 who can close the sale or deliver effective service. There can also be an improved customer experience and lower customer effort, and improved employee experience by being able to connect with more engaged, hotter leads.

Figure 9:
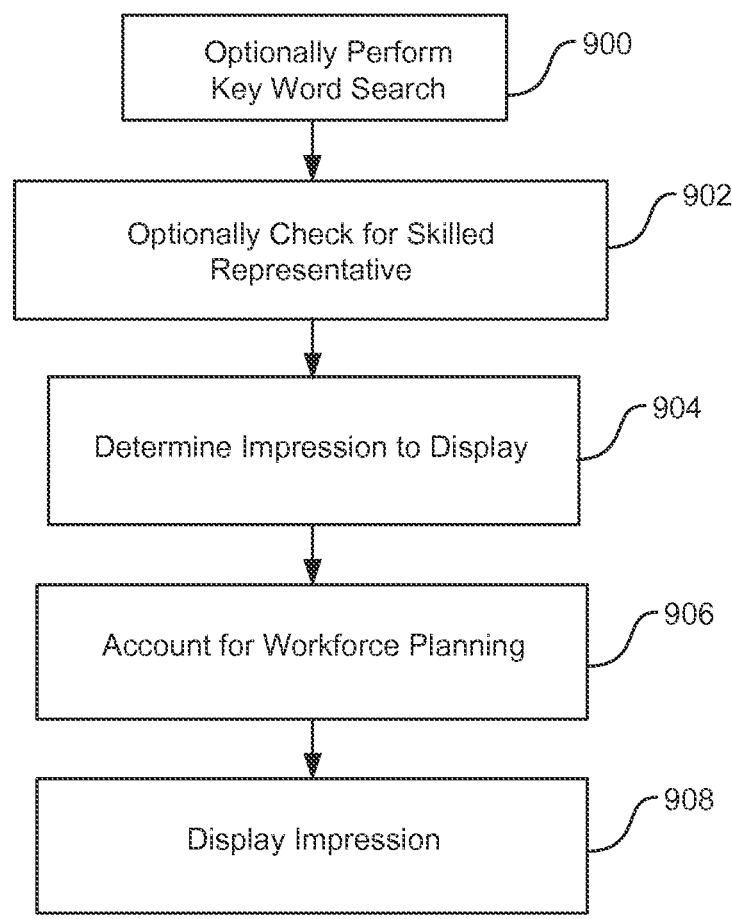
FIG. 9 is a flowchart of an example of market attribution based on workforce management (WFM) forecasting.

FIG. 9 is a flowchart of an example of market attribution based on workforce management (WFM) forecasting. Workforce management (WFM) algorithms can be used to project an organization's workforce planning forecasts of representatives 206 needed with particular skill-sets, e.g., a set of one or more desired skills for handling that type of interaction/sales opportunity, and/or proficiency level per skill. The WFM forecasting is augmented with historical and/or projected impression 104 purchase/display demand volumes, e.g., data provided via ad exchanges 112 and/or the demand side platform 108. This allows an organization to adjust its staff planning, e.g., hiring, training, scheduling, to meet the demand for specialized skilled resources to support projected volumes of impression 104. Additionally or alternatively, when the market processing system 402 determines with WFM information that there is a high knowledge corpus of representatives 206 available at the enterprise 208, and therefore the market processing system 402 has a high confidence in closing a sale on a product or a service, the marketing processing system 402 can serve more impressions 104 and/or the price per bid can increase.

For example, a home buyer uses a search engine 409 to do a keyword search for mortgage rates on a website (900). Alternatively, a search need not be conducted for a bank to display an impression 104. The bank may want to display impressions 104 for its mortgage loans on the website when it has skilled mortgage loan officers available to handle potential inquiries (902). Alternatively, the bank need not check for an available skilled representative 206. The search engine marketing platform 404 sends the user's search information to an ad exchange 112, which coordinates with the demand side platform 108 to determine the appropriate impression 104 to display according to various attributes and business rules, e.g., as described above. This process may involve ad bidding. The enterprise 208 sends the demand side platform 108 the status of its availability of mortgage-skilled representatives 206, so the demand side platform 108 and ad exchange 112 can take this into account when determining which impression 104 to display (904). The demand side platform 108 can provide the enterprise 208 with historical and/or projected demand for mortgage-related impressions 104, based on the web user interest it has seen in the past and/or recent trends. The enterprise 208 can take this data into account in its workforce planning models, so that it accurately forecasts the number of mortgage-skilled representatives 206 needed at particular times in order to effectively and cost-efficiently capture the marketing opportunity (906). The impression 104 is displayed and the skilled representative 206 is standing by (908).

With the marketing attribution-based WFM forecasting, the organization can proactively adjust its resource staff forecasting based on historical or trending ad-demand patterns, to ensure that it neither under- nor over-servicing the potential market opportunity. In addition, for high-value items, it can be beneficial to ensure the right-skilled resource is available to support an impression 104 that is delivered to a user, and that staff planning matches projected marketing lead volumes. The WFM forecasting can be implemented as part of an ad purchase/display decision template and associated with a script of the orchestration application 822 or other rule system. The solution can make use of the core customer experience platforms for representative skill-set and availability data, as well as skills-based routing and contextual computer telephony integration (CTI) screen-pop capabilities, e.g., in FIGS. 6 and 7. The WFM solution can enable skilled resource allocation, scheduling, and forecasting capabilities, and include real-time awareness of detailed representative skill-sets and availability. It also includes the ability to correlate historical or trending ad-demand with skilled resource planning and forecasting.

The systems and methods described above may be implemented in many different ways in many different combinations of hardware, software firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, it can be apparent that many more embodiments and implementations are possible. Accordingly, the embodiments are not to be restricted.

The invention claimed is:

1. A system comprising:
a processor; and
a memory, wherein the memory includes instructions that, when executed by the processor, cause the processor to:
 identify contact information for a contact point from a pool of available contact points, wherein the identified contact information is associated with advertising material displayed on an end user device;
 identify an interaction addressed to the contact point in response to the advertising material being displayed on the end user device;
 gather data about the interaction addressed to the contact point;
 forward the gathered data for associating the gathered data with the advertising material; and
 release the contact point to the pool of available contact points.

2. The system of claim 1, wherein the contact information is at least one of a telephony number or an email address.

3. The system of claim 1, wherein the contact information is displayed on the end user device with the advertising material.

4. The system of claim 1, wherein the advertising material is a web invitation to engage with a contact center agent.

5. The system of claim 1, wherein the advertising material is provided as a result of a web query submitted by the end user device.

6. The system of claim 1, wherein the data about the interaction includes an outcome of the interaction.

7. The system of claim 1, wherein the instructions further cause the processor to update an attribute associated with the advertising material based on the gathered data.

8. The system of claim 7, wherein the attribute includes at least one of a number of the advertising material to be delivered, location to which the advertising material is to be delivered, or advertising budget.

9. The system of claim 1, wherein the instructions further cause the processor to:
 transmit a request in response to identifying the interaction addressed to the contact point; and
 transmit information for identifying the advertising material in response to the request, wherein the gathered data is forwarded with the information for identifying the advertising material.

10. A method comprising:
 identifying, by one or more processors, contact information for a contact point from a pool of available contact points, wherein the identified contact information is associated with advertising material displayed on an end user device;
 identifying, by the one or more processors, an interaction addressed to the contact point in response to the advertising material being displayed on the end user device;
 gathering, by the one or more processors, data about the interaction addressed to the contact point;
 forwarding, by the one or more processors, the gathered data for associating the gathered data with the advertising material; and
 releasing, by the one or more processors, the contact point to the pool of available contact points.

11. The method of claim 10, wherein the contact information is at least one of a telephony number or an email address.

12. The method of claim 10, wherein the contact information is displayed on the end user device with the advertising material.

13. The method of claim 10, wherein the advertising material is a web invitation to engage with a contact center agent.

14. The method of claim 10, wherein the advertising material is provided as a result of a web query submitted by the end user device.

15. The method of claim 10, wherein the data about the interaction includes an outcome of the interaction.

16. The method of claim 10, wherein the instructions further cause the processor to update an attribute associated with the advertising material based on the gathered data.

17. The method of claim 16, wherein the attribute includes at least one of a number of the advertising material to be delivered, location to which the advertising material is to be delivered, or advertising budget.

18. The method of claim 10 further comprising:
 transmitting a request in response to identifying the interaction addressed to the contact point; and
 transmitting information for identifying the advertising material in response to the request, wherein the gathered data is forwarded with the information for identifying the advertising material.

* * * * *